(12) United States Patent
Vilbrandt et al.

(10) Patent No.: US 9,945,358 B2
(45) Date of Patent: Apr. 17, 2018

(54) SAFETY CHAIN AND METHOD FOR OPERATING A WIND TURBINE

(75) Inventors: Reinhard Vilbrandt, Rostock (DE); Ingo Ibendorf, Rostock (DE)

(73) Assignee: AE ROTOR HOLDING B.V., Hengelo (NL)

( * ) Notice: Subject to any disclaimer, the term of this patent is extended or adjusted under 35 U.S.C. 154(b) by 963 days.

(21) Appl. No.: 14/123,973

(22) PCT Filed: Jul. 6, 2012

(86) PCT No.: PCT/EP2012/063240
§ 371 (c)(1),
(2), (4) Date: Dec. 5, 2013

(87) PCT Pub. No.: WO2013/010814
PCT Pub. Date: Jan. 24, 2013

(65) Prior Publication Data
US 2014/0127014 A1    May 8, 2014

(30) Foreign Application Priority Data
Jul. 15, 2011   (DE) .......................... 10 2011 079 269

(51) Int. Cl.
*F03D 7/02*    (2006.01)
*F03D 7/04*    (2006.01)

(52) U.S. Cl.
CPC ............. *F03D 7/042* (2013.01); *F03D 7/026* (2013.01); *F03D 7/0224* (2013.01); *F03D 7/0264* (2013.01); *F03D 7/047* (2013.01); *F05B 2260/76* (2013.01); *F05B 2260/85* (2013.01);

(Continued)

(58) Field of Classification Search
CPC ........ F03D 7/022; F03D 7/0224; F03D 7/026; F03D 7/042; F03D 7/047; F03D 7/0264
See application file for complete search history.

(56) References Cited

U.S. PATENT DOCUMENTS

| 2008/0290664 A1 | 11/2008 | Kruger |
| 2009/0193894 A1 | 8/2009 | Kabatzke |
| 2009/0224543 A1 | 9/2009 | Steudel et al. |

(Continued)

FOREIGN PATENT DOCUMENTS

| DE | 20 2005 014 629 U1 | 2/2006 |
| DE | 10 2005 034899 A1 | 2/2007 |

(Continued)

OTHER PUBLICATIONS

German Search Report dated May 29, 2012.

(Continued)

*Primary Examiner* — Richard Edgar
*Assistant Examiner* — Michael Sehn
(74) *Attorney, Agent, or Firm* — Norris McLaughlin & Marcus P.A.

(57) ABSTRACT

A blade adjusting device for a wind turbine is connected to a plant safety chain and can open and close the plant safety chain by activating a switch. If a fault is detected in one of the blade adjusting devices, the respective control unit can open the plant safety chain. By opening the safety chain, a signal is sent to the blade adjusting devices, and so all the blade adjusting devices initiate a synchronous safety operation of at least two rotor blades when the signal is received.

12 Claims, 3 Drawing Sheets

(52) U.S. Cl.
CPC ..... *F05B 2270/1074* (2013.01); *Y02E 10/723* (2013.01)

(56) References Cited

U.S. PATENT DOCUMENTS

2009/0295161 A1* 12/2009 Steiner .................. F03D 7/0224
290/44
2010/0013227 A1 1/2010 Weitkamp

FOREIGN PATENT DOCUMENTS

| | | |
|---|---|---|
| DE | 10 2006 034 251 A1 | 1/2008 |
| DE | 10 2008 007 519 A1 | 8/2009 |
| DE | 10 2008 012 957 A1 | 9/2009 |
| DE | 10 2009 054 032 A1 | 5/2011 |
| WO | 2007/132303 A1 | 11/2007 |

OTHER PUBLICATIONS

International Search Report dated Nov. 23, 2012, dated Dec. 7, 2012.
English Translation of International Search Report dated Nov. 23, 2012, dated Dec. 7, 2012.

* cited by examiner

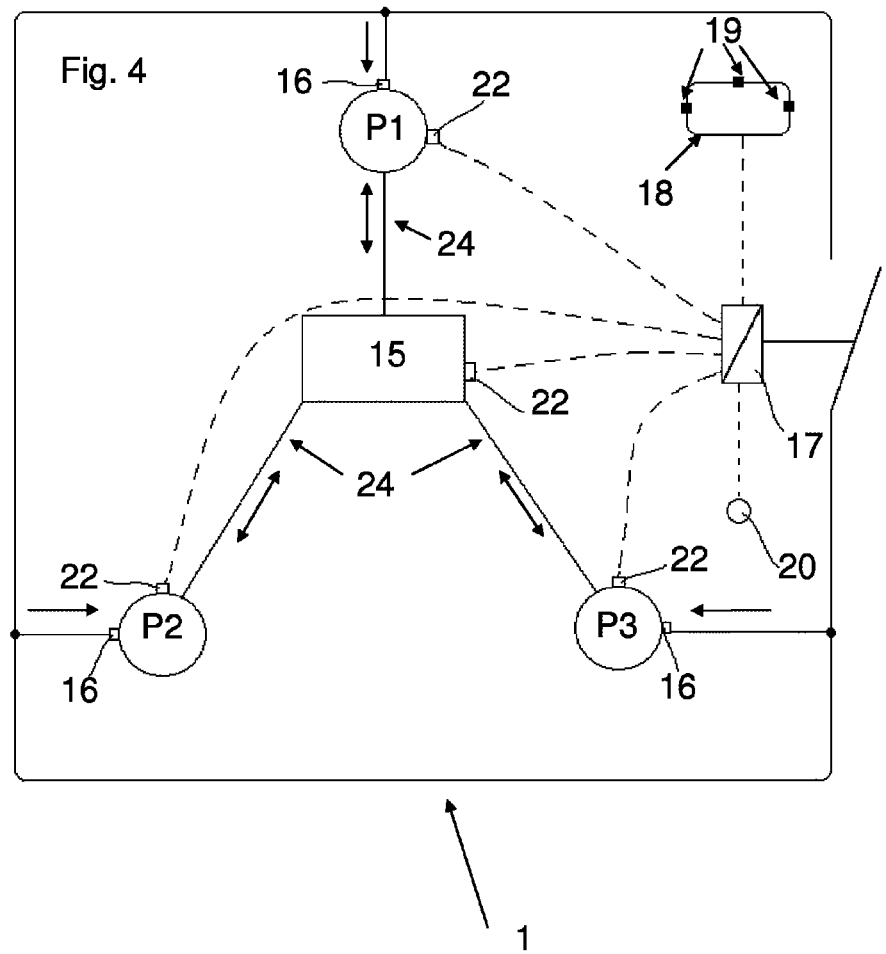

SAFETY CHAIN AND METHOD FOR OPERATING A WIND TURBINE

This application is a 371 application of PCT/EP2012/063240 filed Jul. 6, 2012, which claims foreign priority benefit under 35 U.S.C. § 119 of German application 10 2011 079 269.4 filed Jul. 15, 2011.

The invention relates to a wind turbine with a safety chain for monitoring and shutdown of a wind turbine, a blade adjusting device required for this purpose and a method for monitoring and shutdown of a wind turbine.

The wind turbine includes a tower, a nacelle mountable on the tower, a generator mounted in the nacelle and connected via a drive shaft to the generator rotor. The rotor includes a hub, at least one rotor blade, a bearing mountable between a rotor blade and hub and an adjusting device. The bearing includes an inner ring and an outer ring which are arranged for rotation relative to one another. The rotor blade is thus arranged on the hub substantially for rotation about its longitudinal axis. The rotor blade can be adjusted and arrested with the adjusting device at different pitch positions. The adjusting device includes at least one electrical adjusting motor that drives a gear connected to the rotor blade, a converter that is coupled to an electric power grid and controls the adjusting motor, and a control unit for controlling the converter and for monitoring the components of the blade adjusting device. To reliably prevent the wind turbine from further rotating in the event of a system failure, the wind turbine has a plant safety chain which is embodied as a cable and connects various components of the wind turbine, such as the adjusting device of the rotor blades and a central turbine controller. Upon detecting a fault in one of the components, a safety operation of the rotor blades is initiated by opening the plant safety chain.

In conventional wind turbines, the function of the components of the wind turbine is monitored by the turbine controller. The turbine controller is hereby coupled to the adjusting devices of the rotor blades and is able to communicate with the respective adjusting devices. The adjusting devices of the rotor blades are usually powered by a general external control voltage. To protect the wind turbine, for example when a fault occurs during operation or in strong winds, a safety operation is initiated, wherein the rotor blades are rotated into the so-called vane position. The vane position is achieved when the rotor blade has been rotated out of the wind, leaving only a minimum contact surface of the rotor blade exposed to the wind. Normally, all blade adjusting devices of the rotor blades are simultaneously controlled by the turbine controller to initiate a safety operation. However, when the control unit of one of the blade adjusting devices detects a critical fault, the defective blade adjusting device according to the prior art may immediately initiate a safety operation. An error message is simultaneously transmitted from the control unit to the turbine controller. The turbine controller processes the error message and then transmits the command to initiate a safety operation to the other blade adjusting devices. A high risk of damage to the wind turbine exists in case of a failure of the turbine controller, since the communication between blade adjusting devices then also fails. When the communication between the blade adjusting devices fails, the blade adjusting devices must autonomously initiate the safety operation. If the individual blade adjusting devices initiate an adjustment of the rotor blades at different times, the rotor is subjected to a non-uniform load due to the different pitch of the blades during the adjusting process. This imbalance may cause damage to the rotor and the turbine.

DE 10 2005 034 899 A1 describes a wind turbine with a system for avoiding these high rotor loads. The blade adjusting device of wind turbine has here a subsidiary module, wherein the subsidiary module is adapted to monitor the operating state of the other blade adjusting devices. In particular, signals relating to triggering of a safety operation or a failure in one of the blade adjusting devices can be detected with the subsidiary module or transmitted by one of the other blade adjusting devices. In normal operation, commands for adjusting the rotor blades are always generated by a central controller of the wind turbine. However, when the central controller fails and one of the blade adjusting devices detects an operating state outside a previously defined range and therefore initiates a safety operation of its associated rotor blade, each of the other blade adjusting devices can recognize this via their associated subsidiary module. The blade adjusting devices are thus able to launch a safety operation and thereby perform a synchronous safety operation of the other two rotor blades. A disadvantage of this system is, among other things, the complex structure which requires a dedicated subsidiary module for each adjusting device and the associated high costs.

It is an object of the invention to provide an improved monitoring function which obviates, inter alia, the disadvantages of the prior art. In particular, an inexpensive and safe method for performing a safety operation of the rotor blades will be presented.

The object is solved according to the invention by the features of the independent claim 1, in that the blade adjusting device has an internal safety chain and a plant safety chain. For the internal system chain, the control unit of the blade adjusting device is configured to monitor, inter alia, all safety-relevant functions and operating parameters of the components of the blade adjusting device, such as the converter, the adjusting motor, a brake, a resolver, a limit switch and/or a power supply, as well as the turbine controller. The operating parameters that can be monitored may be, inter alia, the temperature, location, stress, vibrations and/or rotational speed. The control unit of the blade adjusting device is connected to a turbine controller, for example via a CAN bus, and can exchange data with the control unit via the connection. Both the control unit of the blade adjusting device and the turbine controller are connected via a switch with a physical plant safety chain and can open and/or close the plant safety chain with this switch. The plant safety chain is connected with signal inputs in the control unit of the blade adjusting devices so that an open plant safety chain launches a safety operation of the blade adjusting devices or prevents exiting the vane position. The signal at all signal inputs of the blade adjusting devices changes simultaneously when the plant safety chain is opened. In this way, at least two rotor blades can perform a substantially synchronous safety operation. Although not described further, the internal safety chain and the plant safety chain can also be used in other types of wind turbines, such as gearless turbines, and turbines with other types of blade adjusting devices, such as belt-driven or hydraulic blade adjusting devices.

Before starting the wind turbine, a functional test of the system may be performed. The monitored operating parameters of the components of the blade adjustment are read into the control unit via signal inputs. The control unit then compares the read values with threshold values stored in a memory module. If the monitored values fall within an allowable range delimited by the threshold values, the control unit reports that the functions and the operating parameters of the components of the blade adjustment are in order. The internal safety chain then sends a signal to the switch and to the turbine controller to close the plant safety chain. If the turbine controller indicates an absence of faults, the turbine controller also sends a signal to the switch to close the plant safety chain. The signal at the signal inputs of the plant safety chain changes when the plant safety chain is being closed. The change of the signal allows the blades to exit the vane position.

The operating parameters of the control unit and of the turbine controller can be continuously monitored during the operation of the wind turbine. When a fault occurs in the blade adjusting device, the blade adjusting device can always report this fault to the turbine controller. The blade adjusting device can drive the blade towards the vane position when the turbine controller receives the fault message from the blade adjusting device. For small faults, e.g. when operating parameters are outside the permitted range without threatening the function of the blade adjusting device, the turbine controller can forward the command for driving the blade towards the vane position to the control units of the blade adjusting devices via the direct connection between the control unit of the blade adjusting device and the turbine controller, e.g. via a CAN bus. The blade can be slowly moved towards the vane position when the command is received via this communication path.

When faults occur in the blade adjusting device that can cause damage to the wind turbine, the plant safety chain can be opened by the turbine controller. At the same time, for sake of redundancy, a signal for a blade adjustment may also be sent via the direct connection between the turbine controller and control unit of the blade adjusting device. When the plant safety chain is open, no current flows through the plant safety chain, and consequently no voltage is present at the components connected to the plant safety chain. The signal in the plant safety chain is thereby set to low. The control units of the blade adjusting devices simultaneously receive the low signal from the plant safety chain and hence perform a synchronous safety operation of the rotor blades.

In the event of a fault of the turbine controller, the plant safety chain is opened by the turbine controller in the normal case. However, the plant safety chain may also remain closed despite a fault in the turbine controller. Such fault may be, for example, a software error, wherein although the turbine controller does not detect an internal fault because the operating parameters are in order, it cannot correctly process the fault message from the control unit. In this situation, the plant safety chain can also be opened by the blade adjusting devices. The control units of the blade adjusting devices are constructed so that the control units automatically open the plant safety chain unless they receive feedback from the turbine controller within a certain time after a fault message. This time window may be 500 milliseconds; however, the plant safety chain is preferably opened already after 300 milliseconds after the fault message is transmitted from the control unit of the blade adjusting device. When one of the control units of the blade adjusting devices registers a fault of the turbine controller and opens the plant safety chain, movement towards vane position is initiated by the blade adjusting devices only after the low signal of the plant safety chain is present at the signal inputs of the control units. This ensures that the adjustment of the three blades is initiated in synchronism, thus keeping the load on the turbine low.

For safety reasons, the control unit of the blade adjusting device can also trigger an immediate safety operation when registering a truly critical internal fault, and simultaneously open the plant safety chain. This is a state of emergency and only happens with faults that impair the function of the blade adjusting device, e.g. failure of the converter, brake failure or failure of the resolver, e.g. due to overheating or overcurrent. The one blade adjusting device may possibly perform only a very slow safety operation or no safety operation at all, due to the reduced function of the one blade adjusting device. An attempt for a safety operation will therefore be started as soon as possible. However, simultaneously opening the plant safety chain ensures that at least the two still functional blade adjusting devices synchronously execute a safety operation.

Surprisingly, it has been observed that this solution according to the invention solves for the first time the problem of a non-synchronous safety operation of all blades. It has been found through exhaustive investigations of the wind turbines that a non-synchronous safety operation of the various blades can still occur even when using the solution from the prior art, because transmission of the signals and processing of the message causes a certain delay in the switching operations of the individual blade adjusting devices. Thus, the safety operation of the last blades is initiated slightly later than the safety operation of the first blade. This non-synchronous safety operation of the rotor blades creates an unbalance in the rotor which causes high loads on the wind turbine. Even a difference in angle of 2-3° between the rotor blades can cause damage to the turbine.

The invention hence discloses that each blade adjusting device has its own internal safety chain that operates exclusively on the switch of the plant safety chain and on the turbine controller. Thus, there is no direct communication between the internal safety chains. The individual internal safety chains are logically interconnected indirectly via the plant safety chain only to enable the operation of the wind turbine or as an activation signal of a safety operation of the blade adjusting devices.

The plant safety chain may also be connected by way of a switch to the turbine controller and to a chain of emergency stop switches and may be opened both from the turbine controller and from the chain of emergency stop switches.

The plant safety chain is then opened when at least one of the internal safety chains is opened and/or when the chain of emergency stop switches is opened and/or when the turbine controller reports lack of operational readiness. The plant safety chain is closed only when all the internal safety chains are each closed, the turbine controller reports operational readiness and the chain of emergency stop switches is closed. Advantageously, the systems for opening and/or closing of the plant safety chain are each connected via a dedicated switch to the plant safety chain. The plant safety chain can then still be operated by the other switches in case one switch fails. In another embodiment, the plant safety chain may also be opened and closed by other components of the wind turbine, such as service hatches. As a last resort—when both the internal safety chains of the blade adjusting devices and the turbine controller fail—the plant safety chain can preferably also be opened by a speed sensor that detects an excessive rotation speed of the rotor or by a vibration sensor when a threshold value is exceeded.

The plant safety chain advantageously includes a cable and at least one switch for opening and/or closing the plant safety chain. The cable conducts a signal that depends on the status of the monitored component. The signal may have two different states, wherein in the first state, the signal preferably consists of a voltage having a value within a first high range, and wherein in the second state, the signal consists of a voltage having a value within a second low range. The signal having the higher voltage corresponds to a binary number one, whereas the signal having the low voltage corresponds to a binary number zero. The ranges of the voltage signal are selected so that they clearly differ from each other. For example, the first range may extend from 2.0 V to 5.0V and the second region may extend from 0V to 0.8V. When all monitored systems are functioning properly, the plant safety chain is closed and the high signal, the binary one, is transmitted to the components associated with the plant safety chain. When the plant safety chain is closed, current can flow through the plant safety chain, i.e. a voltage is then present at the components associated with the plant safety chain. When a fault is detected, the safety chain opens and the signal is set to low, corresponding to the binary 0. The blade adjusting device can automatically initiate a safety operation of its rotor blade when receiving the low signal. It would also be possible to set a high signal to indicate a fault and a low signal to indicate a properly functioning system. When the plant safety chain is open, no current can flow through the plant safety chain, so that no voltage is present at the components connected to the plant safety chain and the signal has a low value. Advantageously, a low signal is therefore used to indicate of a fault, thereby ensuring that the blade adjusting device initiates a safety operation when the safety chain fails, for example due to a cable break.

In particular, the invention is characterized in that a substantially synchronous safety operation of blade adjusting devices can be performed. The solution according to the invention will now be explained in detail.

When the wind turbine starts up, the rotor blades are usually in the vane position and the plant safety chain and the internal safety chains are open. Before the rotor blades are able to leave the vane position, the functionality of the converter and of the other components of the blade adjusting device may be checked by the control unit of the blade adjusting device. During the check, the operating parameters of the monitored components of blade adjusting device are compared with previously defined lower and/or upper threshold values. If the operating parameters are within the allowed range defined by the threshold values, then the state of the component is set to be in order, i.e. fault-free.

Since the converter is unable to produce a control voltage from the mains voltage when in the powered-off state, the converter may be connected to a general external control voltage supply for starting the wind turbine. Advantageously, the general external control power supply voltage has the same voltage as the operating voltage of the blade adjusting device, which is typically 24 volts. The external control voltage can be supplied, for example, from a cabinet in the nacelle of wind turbine to the blade adjusting devices via a slip ring. The converter is started with the general external control voltage supply. Thereafter, the control unit of the blade adjusting device switches to a power supply and a battery that can be connected to a voltage intermediate circuit of the converter, for supplying emergency power to the blade adjusting device in the event of failure of the mains voltage. After the mains voltage and the battery are switched on, the control unit can check the operation of the battery and the mains voltage. When there are no faults, an internal control voltage is generated from the mains voltage by a power supply arranged in a DC intermediate circuit of the converter. The power supply is designed so as to always generate a constant, usually lower voltage regardless of the voltage in the DC intermediate circuit. Since a fault in the general external control voltage supply can affect all blade adjusting devices alike and a failure of blade adjusting devices could in the worst case cause the destruction of the entire system, the control voltage supply of the blade adjusting device is switched over by a switch from the general external power supply to the internal power supply before starting the wind turbine. The control voltage supplies of the blade adjusting devices can thus be completely galvanically separated from each other, so that a fault in one of the control power supplies has no effect whatsoever on the other control power supplies.

By switching to the internal control power supply, the blade adjusting devices can be operated decoupled from each other; thus, a fault in the control voltage supply will affect only one blade adjusting device. The other blade adjusting devices can place their blades into the vane position, and thus slow down the wind turbine, in spite of the failure of the control voltage supply of the first blade adjusting device. Another functional test of the components of the blade adjusting device can be performed before the general external control power supply is switched off and the internal control power supply is switched on. When this functional test also shows an absence of faults and when the operating parameters are within a permitted range, a switchover to internal control voltage supply occurs and the control unit of the blade adjusting device can close the internal safety chain and transmit to the switch of the plant safety chain a signal to close the plant safety chain. A signal signaling the operational readiness can also be transmitted to the turbine controller system.

After all internal safety chains and the chain of emergency stop switches have been closed, and the turbine controller has reported operational readiness, the plant safety chain can likewise be closed. By closing the plant safety chain, the blade adjusting device receives a high voltage signal, which corresponds to a binary one, and the vane position is released.

The critical functions of the converter and the other components of the blade adjusting device can be continuously monitored by the control unit of the respective blade adjusting device during the operation of the wind turbine. The status of the blade adjusting device is transmitted from the control unit of the blade adjusting device to the turbine controller. If a fault is detected in one of the blade adjusting devices, the turbine controller controls the blade adjusting devices under normal circumstances so that a synchronous movement of the blades towards the vane position is initiated. For non-critical faults, a slow speed movement is advantageously performed in the direction of vane position, with a reduced angular velocity in relation to the maximum angular velocity, so as to keep the loads on the wind turbine low. This blade movement can be controlled via the direct connection between the control units of the blade adjusting devices and the turbine controller.

For critical faults, the rotor blades can be moved by a safety operation in the vane position. During the safety operation, the rotor blades are rotated with maximum angular velocity of the blade adjusting device out of the wind to allow rapid deceleration of the wind turbine. However, the rapid deceleration exposes the wind turbine to high loads, since the force acting on the rotor blades is abruptly removed. The safety operation is started by opening the plant safety chain from the turbine controller. However, for redundancy, a signal can also be transmitted via the direct connection between the control units of blade adjusting devices and the turbine controller. Since the signal transmission is much faster via the plant safety chain, this signal is first to arrive at the control units.

Measurements on a turbine have shown that starting blade movement via the direct connection between the control units of the blade adjusting devices and the turbine controller can take between 50 and 200 milliseconds, whereas starting with a plant safety chain takes only about 5 milliseconds. Opening of the plant safety chain changes the signal applied to the inputs of the control signal units, and the control units start synchronously the safety operation of the rotor blades. As a result, any imbalance in the rotor due to different pitch angles of the rotor blades is eliminated. The blade adjusting device can remain connected to the internal power supply during blade adjusting process and after reaching the vane position. After the vane position has been reached, the functionality of the components of the blade adjusting device and of the converter may be checked. If a fault is detected, the wind turbine is switched off; otherwise a new startup attempt is made.

If the internal power supply fails during operation, for example due to loss of power from the mains, the battery can be connected to the blade adjusting device to supply emergency power. The battery supplies a voltage to the DC intermediate circuit of the converter, enabling the converter to supply an operating voltage to the adjusting motor. To continue operating the converter, a control voltage is derived from the battery via the power supply arranged in the intermediate circuit. Thus, the functionality of the blade adjusting device can be maintained.

When the turbine controller detects a failure of the mains supply, the turbine controller can control the blade adjusting devices to move the rotor blades toward the vane position. Depending on the type of fault, either a slow movement or a safety operation can be performed. Upon reaching the vane position, the battery may be disconnected after a predetermined time so as not to discharge the batteries too deeply, and the general external power supply may be switched on. For critical faults, for example, when the internal power supply fails despite the presence of a mains voltage, the power supply from the battery may be switched off already before the expiration of a predetermined time while the external general control voltage is switched on by the control unit of the blade adjusting device so that the blade adjusting device can be checked for faults. When the mains voltage returns, a new starting operation of the wind turbine can be initiated automatically.

Further details of the invention will become apparent from the drawings based on the description.

In the drawings:

FIG. 4 shows a plant safety chain of the wind turbine.

Figure 1:
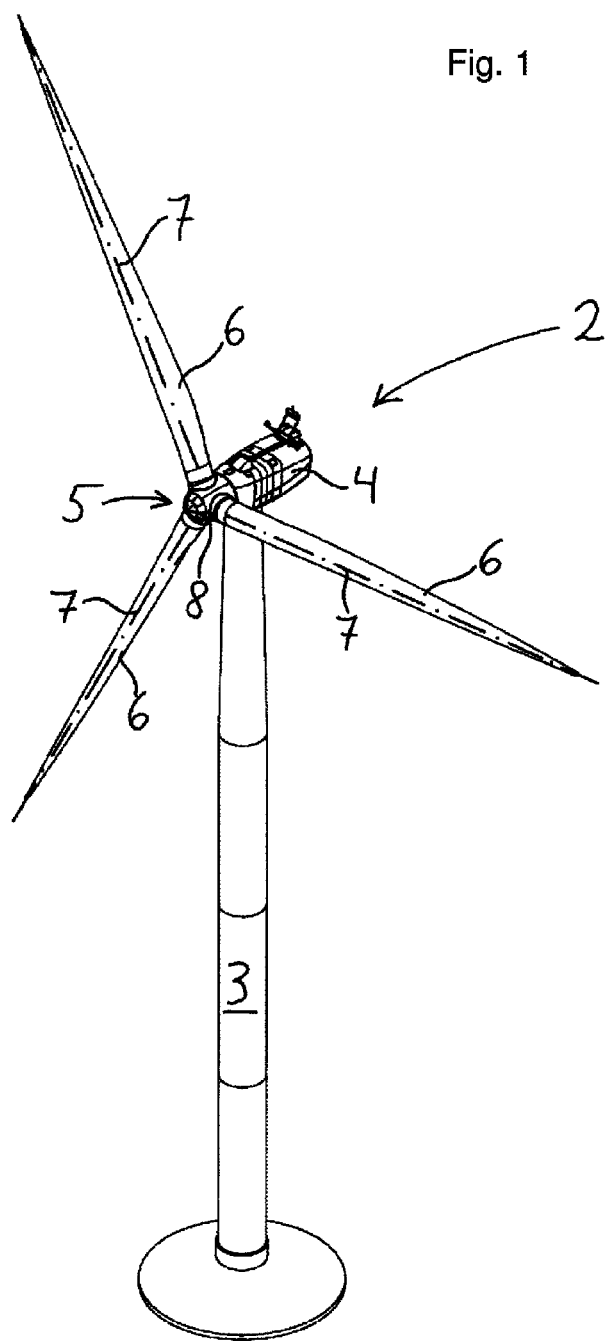
FIG. 1 shows a wind turbine.

FIG. 1 shows a wind turbine 2 with a tower 3, a nacelle 4 rotatably mounted on the tower 3 and a rotor 5 connected via a rotor shaft with a generator disposed in the nacelle 4. The rotor 5 includes a hub 8, three rotor blades 6, each of which being mounted for rotation about a blade axis 7, and a bearing mounted between the hub 8 and the rotor blade 6. Each rotor blade 6 includes a blade adjusting device P1, P2, P3 (FIG. 4) for adjusting the pitch position of the rotor blade 6, and a brake for holding the rotor blade in a desired pitch position. The blade adjusting device P1, P2, P3 includes an adjusting motor 9, a drive pinion 11 disposed on an output shaft 10 of the adjusting motor 9, a sprocket wheel in engagement with the drive pinion 11, a converter 12 for supplying a current and/or a voltage to the adjusting motor 9, and a control unit 13 for controlling and/or regulating the converter 12.

Figure 2:
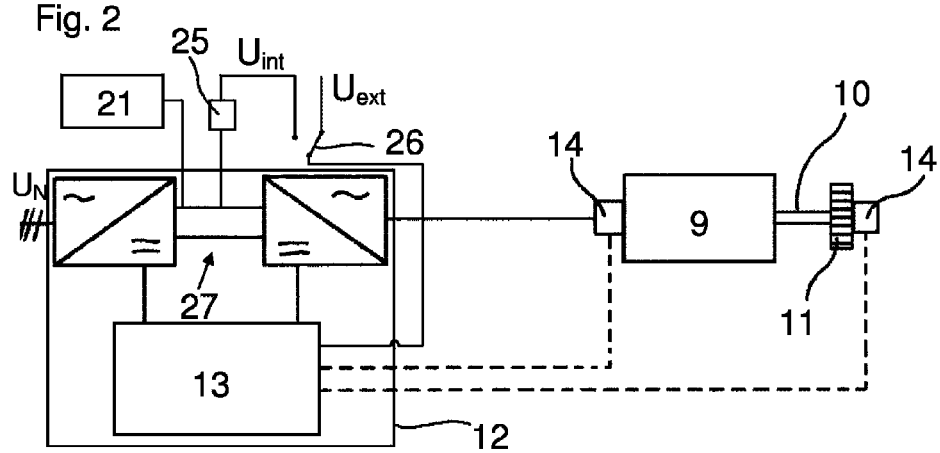
FIG. 2 shows an adjusting device of the wind turbine.

FIG. 2 shows the blade adjusting device P1, P2, P3 of the wind turbine 2. The rotor blade 6 is adjusted via the adjusting motor 9 connected to the hub 8, wherein the adjusting motor 9 moves the rotor blade 6 that is rotatably supported on the hub 8 via a drive pinion 11 that can be mounted on a drive shaft 10 of the adjusting motors 9. A converter 12 supplies an operating voltage to each of the blade adjusting devices P1, P2, P3. Each of the blade adjusting devices P1, P2, P3 also includes a control unit 13 for controlling or regulating the operating voltage supplied to the adjusting motor 9 by the converter 12 and for monitoring the status and functions of the components in the blade adjusting device P1, P2, P3. In this exemplary embodiment, the control unit 13 is integrated in the converter 12.

The blade adjusting device P1, P2, P3 is started up by supplying a general external control voltage $U_{ext}$ to the control unit 13 of the converter 12 of the blade adjusting device P1, P2, P3. After the control unit 13 has started the converter 12, the mains supply $U_N$ and the battery 21 is switched on to supply emergency power to the blade adjusting device P1, P2, P3. After the battery 21 and the power supply $U_N$ have been checked for faults and if there are no faults, the converter 12 of the blade adjusting device P1, P2, P3 generates from the mains voltage $U_N$ an internal control voltage $U_{int}$ with the power supply 25 arranged in the DC intermediate circuit 27. After checking the internal control voltage $U_{int}$ and if no faults are detected, a switch 26 is actuated to switch from the general external control voltage $U_{ext}$ to the internal control voltage, and the control unit 13 of the converter 12 is supplied with the internal control voltage $U_{int}$. The switch 26 may hereby be connected to the control unit 13 and may be controlled by the control unit 13. To stop the blade adjusting process, the control unit 13 is connected to a several limit switches 14 which transmit a signal to the control unit 13 when a certain pitch position is reached. The functionality of the components of the blade adjusting device P1, P2, P3 is monitored by an internal safety chain 23 which is integrated in the control unit 13.

Figure 3:
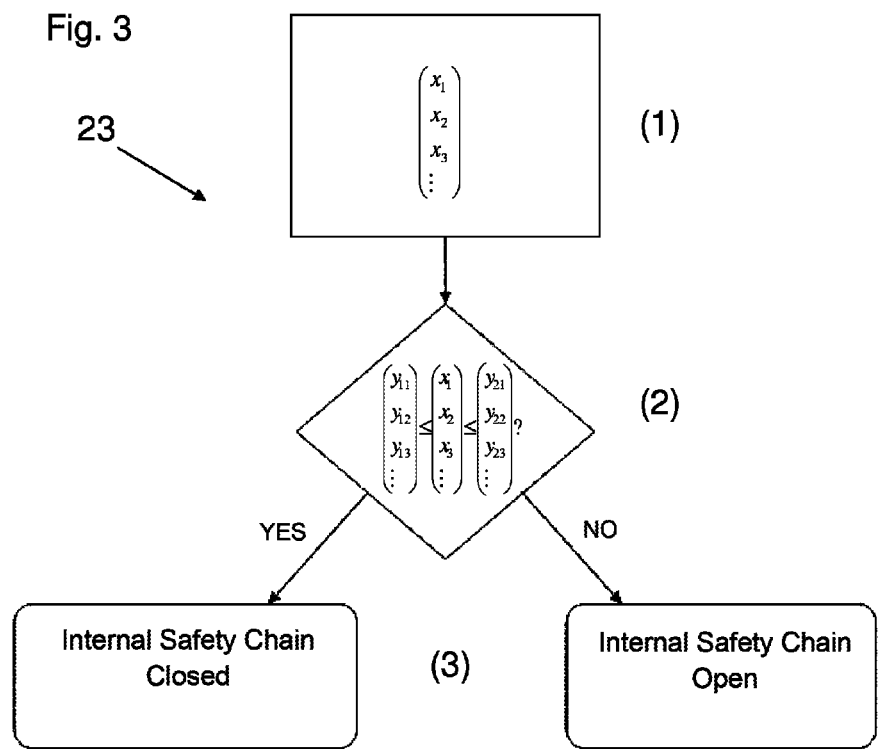
FIG. 3 shows the functionality of the internal safety chain in the controller of the blade adjusting device.

FIG. 3 shows the functionality of the internal safety chain 23 that is integrated in the control unit 13 of the converter 12. To check the functionality and the status of the components of the blade adjusting device P1, P2, P3, the control unit 13 sends at step (1) a query to the respective components of the blade adjusting device P1, P2, P3. The components respond to this query with the respective operating parameters $x_{1-n}$. At step (2), the operating parameters $x_{1-n}$ are compared with threshold values $y_{11-1n}$ and $y_{2-2n}$ stored in a memory module of the control unit 13. The operating parameters may include conditions such as temperature, position, voltage, vibrations and rotational speed and controls that the status lies in the permitted range defined by the threshold values $y_{11-1n}$ and $y_{21-2n}$. When the monitored operating parameters are in order, a signal is sent to the switch 17 to close the plant safety chain 1; otherwise, a signal to open the plant safety chain is sent to the switch 17. The control unit 13 also indicates operational readiness to the turbine controller 15, i.e. absence of faults.

FIG. 4 shows a plant safety chain 1 with the blade adjusting devices P1, P2, P3 of the three rotor blades 6, a turbine controller 15 and the communication paths of the components. The blade adjusting devices P1, P2, P3 are connected via their control units 13 to the turbine controller 15 via the communication path 24 and can both transmit data to the turbine controller 15, as well as receive data from the turbine controller 15. In normal operation of the wind turbine 2, the communication and the regulation of the blade adjusting devices P1, P2, P3 is routed via the communication path 24. In addition to the communication between the control unit 13 and the turbine controller 15, the internal safety chains 23 integrated in the control units 13 of the blade adjusting devices P1, P2, P3 and the turbine controller 15 are connected to the plant safety chain 1 via at least one switch 17, allowing them to open and/or close the plant safety chain 1. Additional systems may also be connected to the switch 17 for opening and/or closing the plant safety chain 1. These systems may include, for example, a chain 18 of emergency stop switches 19 for manually opening the plant safety chain 1 or a sensor 20 for monitoring operating parameters of the wind turbine 2, such as temperature, vibration and/or rotational speed. Advantageously, the systems for opening and/or closing the plant safety chain are each connected to the plant safety chain 1 via a dedicated switch 17. The plant safety chain 1 is connected to the signal inputs 16 of the blade adjusting devices P1, P2, P3 and of the turbine controller 15. When the plant safety chain is closed, a signal having a high voltage is sent from the plant safety chain 1 to the control unit 13 of the blade adjusting devices P1, P2, P3 to release a blade adjusting process. When the plant safety chain 1 is open, no current flows through the plant safety chain 1 and consequently no voltage is applied to the components connected to the plant safety chain 1. The voltage of the signal thus changes from a high to a low value when the plant safety chain 1 is opened. When the control units 13 of the blade adjusting devices P1, P2, P3 receive a low signal from the plant safety chain 1, the release of the blade adjustment is canceled and the blade adjusting device P1, P2, P3 remains in vane position or initiates a safety operation unless the rotor blades 6 are already in the vane position.

When the wind turbine 2 is switched-off, the rotor blades 6 are in the vane position and both the internal safety chains of the blade adjusting devices P1, P2, P3 and the plant safety chain 1 are open. Because the converter 12 is unable to generate a control voltage from the mains voltage $U_N$ when starting from an off-state, the blade adjusting device P1, P2, P3 is powered for startup from a general external control voltage $U_{ext}$. Before the rotor blades 6 are able to exit the vane position, the state of the converter 12 and of the other components of the blade adjusting devices P1, P2, P3 is checked. If no faults are present in the blade adjusting devices P1, P2, P3, the control unit 13 of the blade adjusting device P1, P2, P3 switches the supply voltage $U_N$ and the battery 21 on to supply emergency power to the blade adjusting device. Thereafter, the battery 21 and the connection to the power mains are checked by the control unit 13 for faults.

When there are no faults, the converter switches from the external power supply switches $U_{ext}$ to the internal control voltage $U_{int}$ generated by the power supply 25 disposed in the DC intermediate circuit 27. The internal control voltage supply $U_{int}$ is designed so that the control voltage supplies of the blade adjusting devices P1, P2, P3 are galvanically isolated from each other and a fault in one of the control voltage supplies can not affect the other control power supplies. The functions of the blade adjusting device P1, P2, P3 are checked once more and if everything is in order, the general external control supply voltage $U_{ext}$ is switched off and the internal control voltage supply $U_{int}$ is switched on. Thereafter, the internal safety chain in the blade adjusting device is closed. The control unit 13 then sends a signal to the switch 17 to close the plant safety chain 1 and a signal to notify the turbine controller 15 of the operational readiness.

The plant safety chain 1 is closed when the turbine controller 15 and other components connected to the plant safety chain 1, such as for example at least one sensor 20 measuring the rotational speed and/or vibrations and the chain 18 of emergency stop switches 19, also report operational readiness. When the plant safety chain 1 is closed, a current can again flow through the plant safety chain and a signal having a high voltage is present at the signal inputs 16 of the control units 13 connected to the plant safety chain 1. When a high signal is present at the signal input 16 of the control unit 13 of the blade adjusting devices P1, P2, P3, the blade adjusting devices P1, P2, P3 have permission to move the rotor blade 6 out of the vane position, and the wind turbine 2 can be started.

During the operation of the wind turbine 2, the status of blade adjusting devices P1, P2, P3 is normally transmitted continuously by the respective control units 13 to the turbine controller 15. If one of the blade adjusting devices P1, P2, P3 fails, then this event is communicated to the turbine controller 15. The turbine controller then commands either via the direct connection 24 or via the switch 17 a synchronous movement of the rotor blades 6 toward the vane position.

When the power mains fail, the emergency supply of the blade adjusting device P1, P2, P3 is switched on by the battery 21. The battery is connected to the DC intermediate circuit of the converter 27 and is hence able to supply both an operating voltage to the adjusting motor 9 via the converter 12 as well as a control voltage to the control unit 13 via the power supply 25. The blade adjusting device P1, P2, P3 can then move the rotor blades 6 into the vane position despite a failure of the mains voltage.

For critical faults, for example when the turbine controller 15 fails or when the communication between the turbine controller 15 and the control unit 13 of the blade adjusting device P1, P2, P3 is faulty or interrupted, the plant safety chain 1 can be opened by one of the controllers 13. When the plant safety chain is opened, the signal is set to low and the blade adjusting devices P1, P2, P3 synchronously initiate a safety operation upon receiving the low signal at the signal input 16 of the control unit 13. When all control units 16 of the blade adjusting devices P1, P2, P3 fail, the plant safety chain 1 can also be opened by the at least one sensor 20 or by the chain 18 of emergency stop switches 19.

The combinations of features disclosed in the described exemplary embodiments are not intended to limit the scope of the invention; instead, the features of different embodiments can also be combined.

LIST OF REFERENCE SYMBOLS

| | |
|---|---|
| 1 | plant safety chain |
| 2 | Wind turbine |
| 3 | Tower |
| 4 | Nacelle |
| 5 | Rotor |
| 6 | Blade |
| 7 | Blade axis |
| 8 | Hub |
| 9 | Adjusting motor |
| 10 | Power |
| 11 | Drive pinion |
| 12 | Converter |
| 13 | Control unit |
| 14 | Limit switch |
| 15 | Turbine controller |
| 16 | Signal Input |

-continued

| 17 | Switch |
| 18 | Chain of emergency stop switches |
| 19 | Emergency stop switch |
| 20 | Sensor |
| 21 | Battery |
| 22 | Signal output |
| 23 | Internal safety chain |
| 24 | Communication path |
| 25 | Power supply |
| 26 | Switch |
| 27 | DC intermediate circuit |
| P1 | Blade adjusting device |
| P2 | Blade adjusting device |
| P3 | Blade adjusting device |
| $U_N$ | Mains voltage |
| $U_{ext}$ | External control voltage supply |
| $U_{int}$ | Internal control voltage supply |

The invention claimed is:

1. A blade adjusting device for a rotor blade of a rotor of a wind turbine,
Wherein the rotor comprises a hub, at least one rotor blade rotatably mounted on the hub for rotation about a longitudinal axis of the rotor blade, and wherein the rotor is rotatably mounted on a nacelle of the wind turbine,
The rotor blade is rotatable by way of the blade adjusting device and arrestable at various pitch positions,
The wind turbine comprises a central turbine controller for monitoring and controlling components in the wind turbine, among others the blade adjusting device,
And wherein the blade adjusting device comprises an adjusting motor for driving and/or arresting the rotor blade, a converter for driving the adjusting motor, a control unit for controlling the converter and a battery for supplying emergency power to the blade adjusting device,
The blade adjusting device comprises a plant safety chain and an internal safety chain integrated in the control unit of the adjusting device,
wherein the converter comprises a power supply for generating an internal control voltage ($U_{int}$) from the mains voltage ($U_N$), wherein the power supply is arranged in a DC intermediate circuit of the converter.

2. The blade adjusting device according to claim 1, wherein the plant safety chain comprises at least one switch, the switch is connected to signal outputs of the control unit of the blade adjusting device and of the turbine controller, and the internal safety chain of the control unit and/or of the turbine controller is configured to generate signals for opening and/or closing of the plant safety chain and supply the signals to the switch.

3. The blade adjusting device according to claim 1, wherein the plant safety chain supplies a signal dependent on the state of the plant safety chain to a signal input of the control unit of the blade adjusting device and/or of the turbine controller.

4. The blade adjusting device according to claim 3, wherein the signal can have two different states, wherein the signal has a high voltage value when the plant safety chain is closed and a low voltage value when the plant safety chain is open.

5. The blade adjusting device according to claim 1, wherein the control unit of the converter of the blade adjusting device can be connected to a general external control power supply ($U_{ext}$) and to the internal control voltage supply ($U_{int}$).

6. The blade adjusting device according to claim 5, wherein the control unit of the converter of the blade adjusting device is supplied from the general external control voltage ($U_{ext}$) during startup.

7. The blade adjusting device according to claim 5, wherein the control unit of the converter of the blade adjusting device is supplied from the internal control voltage ($U_{int}$) when the internal safety chain is closed.

8. A wind turbine comprising a nacelle rotatably mounted on a tower and a rotor connected via a drive shaft to a generator mounted in the nacelle, wherein the rotor has a hub and at least one rotor blade, the rotor blade is rotatably connected to the hub by a bearing for rotation about its blade axis extending in the axial direction, and the rotor blade can be driven by a blade adjusting device and arrested at different pitch positions, wherein the blade adjusting device is constructed according to claim 1.

9. A method of starting up a wind turbine, wherein the wind turbine comprises a blade adjusting device according to claim 1, the rotor blades are in the starting position in the vane position, and the method comprises the following steps:
Supplying the control unit of the converter of the blade adjusting device via a general external control voltage supply $U_{ext}$,
Starting the converter
Checking the functionality of the converter and/or of the other components of the blade adjusting device with the control unit the blade adjusting device,
Connecting the battery and the mains power ($U_N$),
Performing a functional test of the battery and of the mains power ($U_N$) with the control unit of the adjusting device,
When no faults are present, generating an internal control voltage ($U_{int}$) by using the power supply arranged in the DC intermediate circuit of the converter,
Performing a functional test of the internal control voltage supply $U_{int}$ with control unit of the blade adjusting device,
When the internal control voltage supply $U_{int}$ is in order, switching over from the general external control voltage supply ($U_{ext}$) to the internal control voltage ($U_{int}$) and closing the internal safety chain,
When the internal safety chains of the blade adjusting devices are closed and the turbine controller system also reports operational readiness, closing the plant safety chain,
Setting the signal in the plant safety chain to high for unblocking departure from the vane position.

10. The method according to claim 9, wherein the method in normal operation of the wind turbine comprises the following steps:
Monitoring critical functions of the converter and/or of the components of the blade adjusting device with the control unit of the blade adjusting device,
Transmitting the state of the blade adjusting device to the turbine controller,
upon detection of a fault condition:
The blade adjusting devices are controlled by the turbine controller to initiate a slow synchronous movement toward the vane position,
The blade adjusting devices remain connected to the internal power supply ($U_{int}$) during the safety operation and in the vane position,
Checking the function of the converter and/or of the components of the blade adjusting device and, when everything is in order, attempting another startup.

11. The method according to claim 9, wherein in event of failure of the mains voltage the method includes the following steps:
- Battery for supplying emergency power to the blade adjusting device is connected,
- Safety operation of the blade adjusting devices is controlled by the turbine controller
- When reaching the vane position, the battery is disconnected after a predetermined time, and the external common power supply ($U_{ext}$) is switched on,
- For critical faults, switching to the external general power supply ($U_{ext}$) before the predetermined time has elapsed and opening the plant safety chain,
- Checking the function of the converter and/or of the other components of the blade adjusting device and, if everything is in order, repeat the startup.

12. The method according to claim 9, wherein for critical faults, such as failure of the turbine controller, or a critical fault in the blade adjusting device, the method comprises the following steps:
- Detecting a fault condition with the control unit of the adjusting device,
- Opening the internal safety chain in the control unit and thus opening the plant safety chain,
- The signal is set to low by opening the plant safety chain,
- When receiving the low signal, simultaneous safety operation of the blade adjusting devices.

* * * * *